United States Patent

Morrison et al.

(10) Patent No.: US 7,568,090 B2
(45) Date of Patent: Jul. 28, 2009

(54) SPEEDY BOOT FOR COMPUTER SYSTEMS

(75) Inventors: John A. Morrison, Fort Collins, CO (US); Michael S. Allison, Fort Collins, CO (US); Stephen P. Hack, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 425 days.

(21) Appl. No.: 11/159,757

(22) Filed: Jun. 23, 2005

(65) Prior Publication Data

US 2006/0294352 A1 Dec. 28, 2006

(51) Int. Cl.
*G06F 15/177* (2006.01)
*G06F 9/24* (2006.01)
(52) U.S. Cl. .................. 713/2; 713/1; 713/100
(58) Field of Classification Search .......... 713/2, 713/1, 100
See application file for complete search history.

(56) References Cited

U.S. PATENT DOCUMENTS

| | | | |
|---|---|---|---|
| 5,325,365 A | | 6/1994 | Moore et al. |
| 5,935,242 A * | | 8/1999 | Madany et al. ............ 713/1 |
| 5,978,913 A | | 11/1999 | Broyles et al. |
| 6,343,696 B1 * | | 2/2002 | McCormick et al. ........ 206/594 |
| 6,374,353 B1 | | 4/2002 | Settsu et al. |
| 6,434,695 B1 * | | 8/2002 | Esfahani et al. ............. 713/2 |
| 6,434,696 B1 * | | 8/2002 | Kang ........................... 713/2 |
| 6,594,756 B1 * | | 7/2003 | Datta et al. .................. 713/2 |
| 6,727,920 B1 | | 4/2004 | Vineyard et al. |
| 6,754,828 B1 * | | 6/2004 | Marisetty et al. ............ 726/2 |
| 2003/0135729 A1 | | 7/2003 | Mason et al. |
| 2003/0204710 A1 * | | 10/2003 | Culter et al. ................. 713/1 |
| 2004/0088531 A1 * | | 5/2004 | Rothman ...................... 713/1 |
| 2004/0143696 A1 | | 7/2004 | Hsieh |
| 2004/0268337 A1 * | | 12/2004 | Culter .......................... 717/168 |
| 2006/0070032 A1 * | | 3/2006 | Bramley et al. ............. 717/124 |

OTHER PUBLICATIONS

"EFI", Retrieved from "http://wiki.osx86project.org/wiki/index.php/EFI", Retrieved on Oct. 11, 2007.*

\* cited by examiner

*Primary Examiner*—Thomas Lee
*Assistant Examiner*—Fahmida Rahman

(57) ABSTRACT

Implementations of speedy boot for computer systems are disclosed. In an exemplary embodiment, a method of speedy boot for a computer system may include invoking a platform management interrupt (PMI) to soft reset a processor without resetting hardware for the processor. The method may also include bypassing at least some initialization procedures and tests to speed recovery of the computer system to a usable state. The method may also include resetting operating system interfaces and loading the operating system.

16 Claims, 5 Drawing Sheets

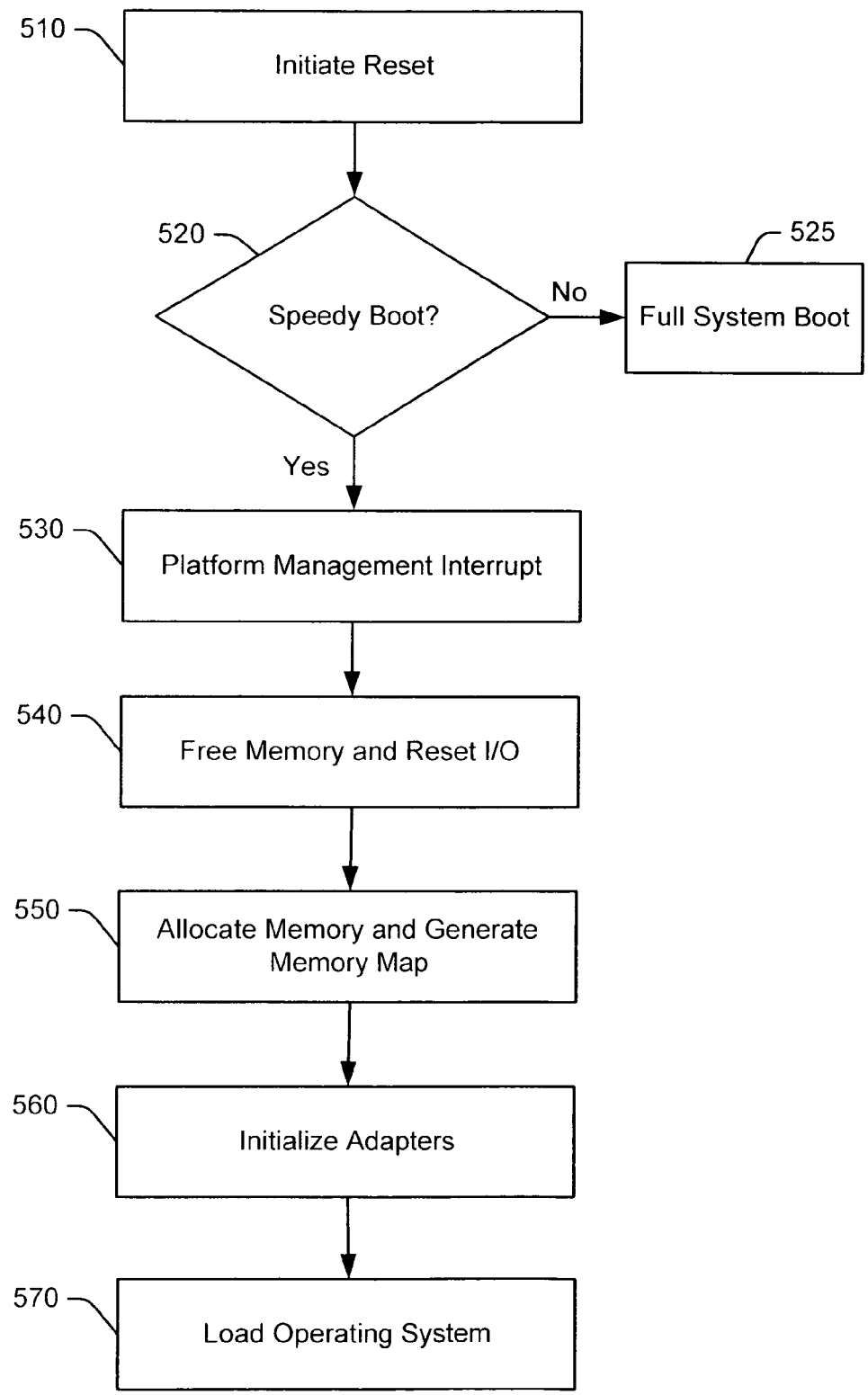

SPEEDY BOOT FOR COMPUTER SYSTEMS

TECHNICAL FIELD

The described subject matter relates to computer systems, and more particularly to speedy boot for computer systems.

BACKGROUND

Each time a computer system is started, various initialization procedures and tests are performed before the computer system is ready to run the operating system and application software. These initialization procedures and tests are typically referred to as the boot sequence. An exemplary boot sequence may include executing a power-on self-test program (POST), followed by execution of the basic input output system (BIOS). The BIOS points to a boot sector on a disk and initializes code to read the master boot record and load the operating system (OS). After the OS initializes, applications can run on the computer system.

When the computer system is restarted or reset, the computer system has to run all of the initialization procedures and perform all of the tests again, reducing productivity while the user waits. If the computer system is a network server, all users on the network needing access to the server must wait for the computer system to reboot.

BRIEF DESCRIPTION OF THE DRAWINGS

FIG. 5 is a flowchart illustrating exemplary operations to implement a speedy boot procedure for a computer system.

DETAILED DESCRIPTION

Briefly, systems and methods described herein may be used to implement speedy boot in a computer system. Before resetting the computer system, a boot sequencer in the firmware core may execute a decision to perform either a full system reset or a speedy boot procedure. For example, the speedy boot procedure may be selected by the user, by default, or by software executing on the computer system. In any event, enabling the speedy boot procedure resets the operating system interfaces and any cached data during the boot sequence, and does not reset the firmware core. The POST program may be bypassed to further speed recovery of the computer system to a usable state.

It is noted that operations described herein may be embodied as logic instructions on a computer-readable medium. When executed, the logic instructions implement the described operations.

Exemplary System

Figure 1:
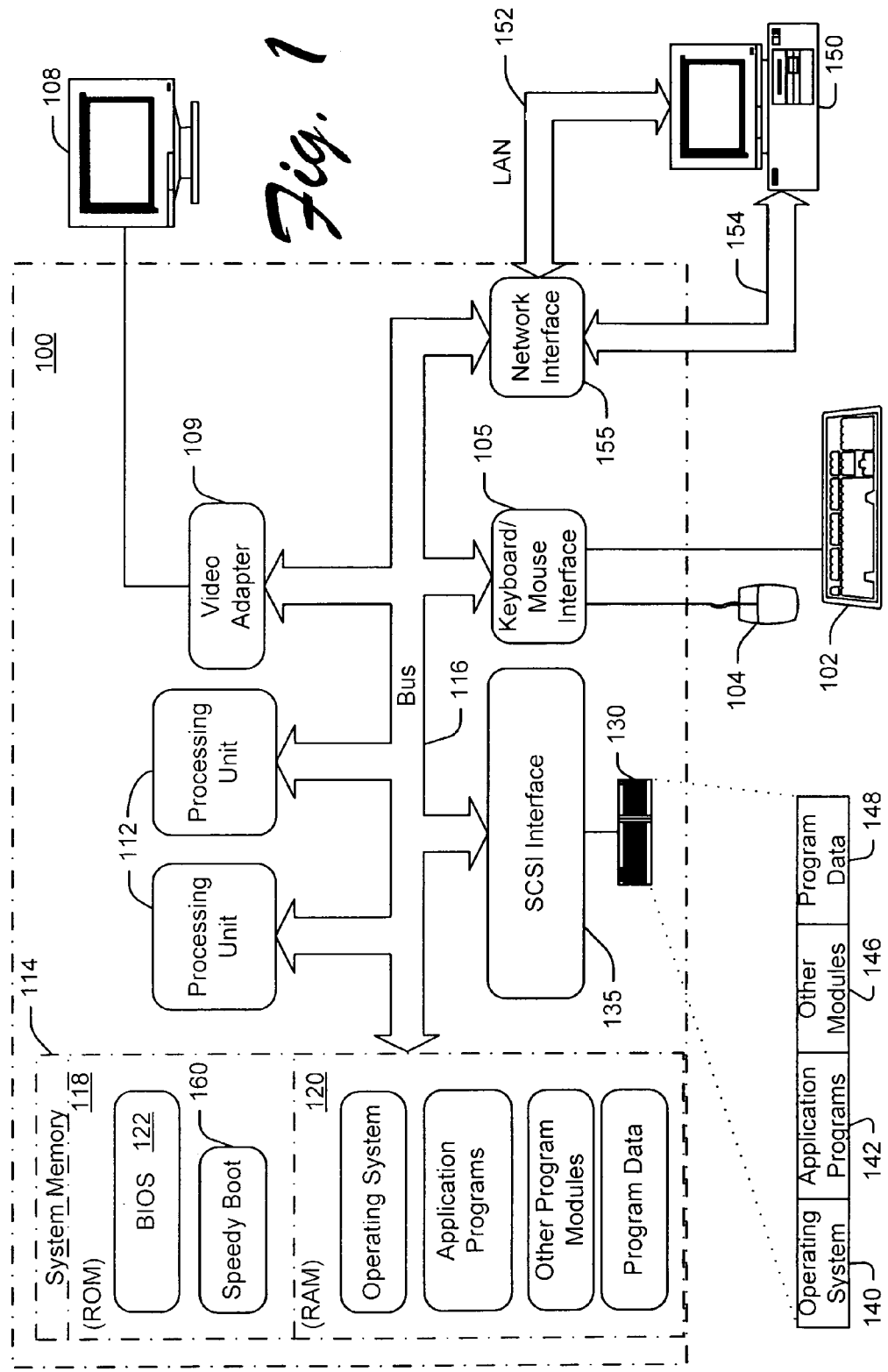
FIG. 1 is a high-level schematic illustration of an exemplary computer system which may be implemented for speedy boot.

FIG. 1 is a high-level schematic illustration of an exemplary computer system which may be implemented for speedy boot. For purposes of illustration, computer system 100 is an Intel Processor Family (IPF)-based, Symmetric Multi-Processing (SMP) server computer. However, it is noted that exemplary computer system 100 is shown for purposes of illustration and is not intended to be limiting. Other suitable computer systems may include personal computers (PCs) or laptop computers, network workstations, appliances, or other computing devices.

Exemplary computer system 100 includes one or more processors or processing units 112, a system memory 114, and a bus 116 that couples various system components including the system memory 114 to processors 112. The processing unit(s) 112 may be partitioned in exemplary embodiments.

Various processor architectures are known in the art, such as the PA-RISC family of processors developed by Hewlett-Packard Company ("HP"), Intel Corporation's ("Intel") architecture ("IA") processors (e.g., the well-known IA-32 and IA-64 processors), and the like. The IA-64 is a 64-bit processor architecture co-developed by HP and Intel, which is based on Explicitly Parallel Instruction Computing (EPIC).

The bus 116 represents one or more of any of several types of bus structures, including a memory bus or memory controller, a peripheral bus, an accelerated graphics port, and a processor or local bus using any of a variety of bus architectures. The system memory 114 includes read only memory (ROM) 118 and random access memory (RAM) 120. A basic input/output system (BIOS) 122, containing the basic routines that help to transfer information between elements within computer system 100, such as during start-up or reboot, is stored in ROM 118.

Computer system 100 further includes one or more hard disk drive 130 for reading from and writing to a hard disk (not shown). The hard disk drive 130 is connected to the bus 116 by a SCSI interface 135 or some other appropriate interface. The hard disk drive 130 and associated computer-readable media provide nonvolatile storage of computer-readable instructions, data structures, program modules and other data for computer system 100. A number of program modules may be stored on the hard disk drive 130, including an operating system 140, one or more application programs 142, other program modules 146, and program data 148.

Although the exemplary environment described herein only shows a hard disk drive 130, other types of computer-readable media such as magnetic cassettes, flash memory cards, digital video disks (DVDs), random access memories (RAMs), read only memories (ROMs), and the like, may also be used in the exemplary computer system 100.

A user may enter commands and information into computer system 100 through input devices such as a keyboard 102 and a pointing device 104. For example, the user may use these input devices to select the speedy boot option from a user interface (not shown). These and other input devices (not shown) are connected to the processing unit(s) 112 through an interface 105 that is coupled to the bus 116. A monitor 108 or other type of display device may also be connected to the bus 116 via an interface, such as video adapter 109.

Computer system 100 may operate in a networked environment using logical connections to one or more remote computers, such as a remote computer 150. The remote computer 150 may be a personal computer, another server computer, a router, a network PC, a peer device or other common network node, and typically includes many or all of the elements described for computer system 100. The logical connections depicted include a local area network (LAN) 152 and a wide area network (WAN) 154 connected to the computer system 100 via a network interface 155.

Generally, the data processors of computer system 100 are programmed by means of instructions stored at different times in the various computer-readable storage media of the computer. Programs and operating systems may be distributed, for example, on floppy disks, CD-ROMs, or electronically, and are installed or loaded into the secondary memory of a computer. At execution, the programs are loaded at least partially into the computer's primary electronic memory 114.

Prior to executing programs, however, various initialization procedures and tests known as the boot sequence are performed for the computer system 100. According to exemplary embodiments, the computer system 100 may implement a speedy boot procedure 160 (e.g., firmware residing in ROM 118). Speedy boot procedure 160 bypasses at least some of the initialization procedures and tests to load the operating system faster than if each of these procedures and tests were performed. Before explaining the speedy boot procedure in more detail, however, it is useful to understand the firmware interfaces and software stack which may be implemented by a computer system for speedy boot.

Figure 2:
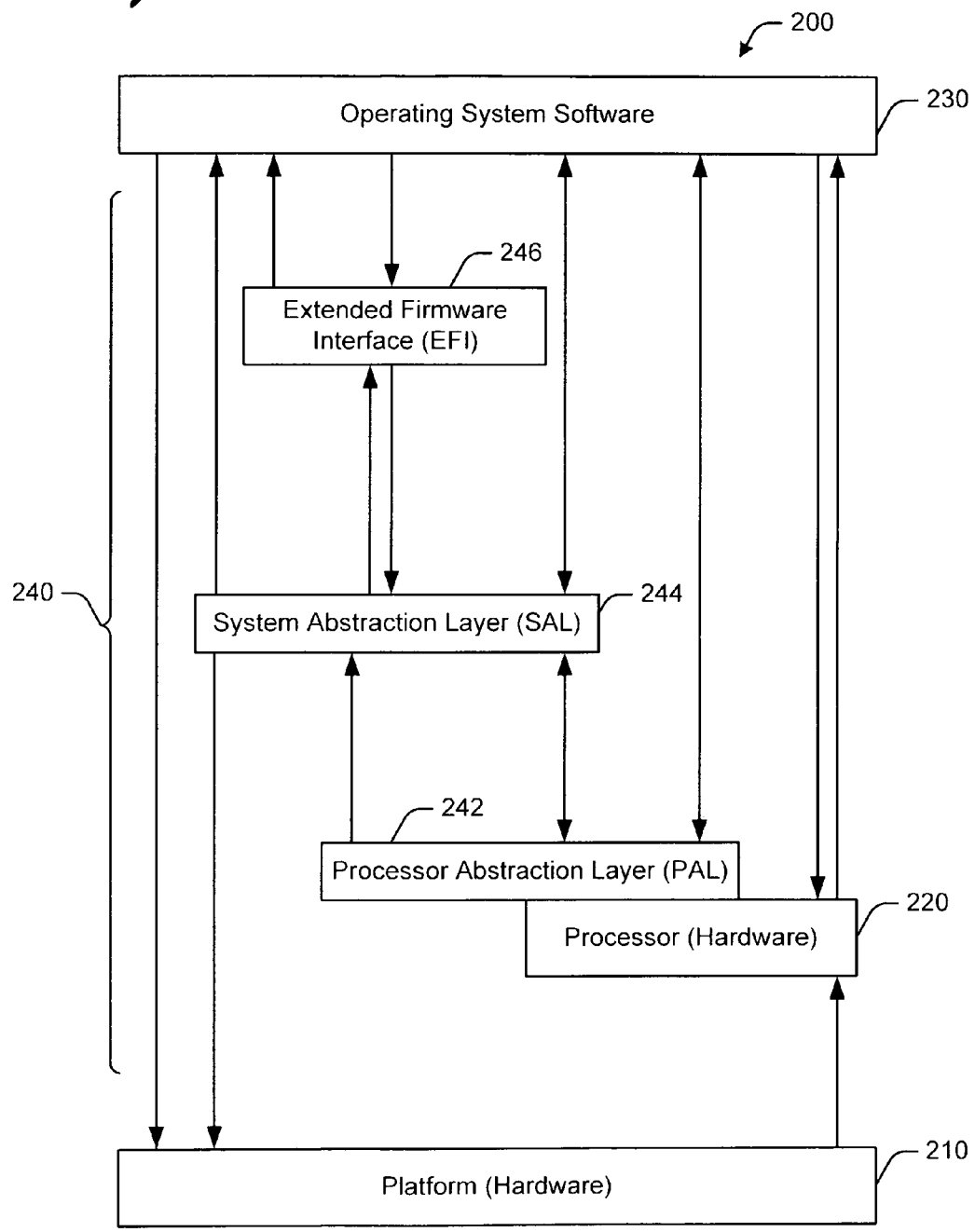
FIG. 2 is a high-level schematic illustration of exemplary firmware interfaces for a computer system implementing speedy boot.

FIG. 2 is a high-level schematic illustration of exemplary firmware interfaces for a computer system implementing speedy boot. Exemplary computer system 200 (corresponding to the computer system 100 in FIG. 1) is a typical IPF-based system, and includes hardware platform 210, processor(s) or processing unit(s) 220, operating system (OS) 230, and system firmware 240. In this example, system firmware 240 includes a Processor Abstraction Layer (PAL) 242, System Abstraction Layer (SAL) 244, and Extended Firmware Interface (EFI) 246.

Exemplary computer system 200 follows the IA-64 architecture, such as has been implemented for the ITANIUM® family of processors commercially available from Intel Corporation. It is noted, however, that other embodiments may be implemented in other processor architectures and are not limited to the IA-64 architecture shown in FIG. 2.

The IA-64 processor architecture definition specifies requirements for firmware architectural elements of systems utilizing IA-64 processors. An exemplary model of this processor architecture is given in the Intel IA-64 Architecture Software Developer's Manual, Volume 2: IA-64 System Architecture, in section 11.1 Firmware Model. It describes that the IA-64 firmware comprises three major components: PAL 242, SAL 244, and EFI 246, which together provide the processor and system initialization for an OS boot. These three components (PAL 242, SAL 244, and EFI 246) may not represent all of the required system firmware functionality for certain IA-64 computer systems. Additional firmware may also be included.

Hardware platform 210 represents the collection of all of the hardware components of system 200 other than the system's processors 220. The arrows between these various components illustrate types of permitted interactions for the behavior of computer system 200. When computer system 200 is first powered on, there are some sanity checks (e.g., POST) that are performed by microprocessors included in platform 210. After those checks have passed, then power and clocks are provided to processor 220. Processor 220 begins executing PAL 242 out of the system's ROM (e.g., ROM 118 in FIG. 1), which gets control of system 200 and begins execution of the other firmware.

After it has initialized the processor(s) 220, PAL 242 passes control of system 200 to SAL 244. SAL 244 discovers the hardware present on platform 210, and initializes the hardware for the OS 230. When the hardware is initialized and functional, firmware 240 (i.e., PAL 242, SAL 244, and EFI 246) is copied into the main memory (e.g., RAM 120 in FIG. 1). Control is passed to EFI 246 to activate boot devices (e.g., the hard disk drive). EFI 246 reads the boot devices, loads a program (e.g., an OS loader) into memory, and then passes it control of computer system 200 by branching one of the processors 220 (typically called the boot startup processor) into the entry point of such OS loader program.

The OS loader program uses the standard firmware interfaces 240 to discover and further initialize the computer system 200. In an Advanced Configuration and Power Management Interface ("ACPI")-compatible system, OS 230 parses the ACPI static tables to discover other processors in a multi-processor system and compile ACPI distributed databases (DDBs) in the tables into the ACPI "namespace." Then, OS 230 uses the firmware interfaces 240 to cause those discovered processors to branch into the operating system code.

Following, initialization, OS 230 and application software controls all of the one or more processors and the firmware 240 is no longer in control of the computer system 200. If the system is reset, the boot sequencer may perform the entire boot sequence for a full system boot. Alternatively, a speedy boot procedure may be implemented to bypass various initialization procedures and tests, as described in more detail below.

Figure 3:
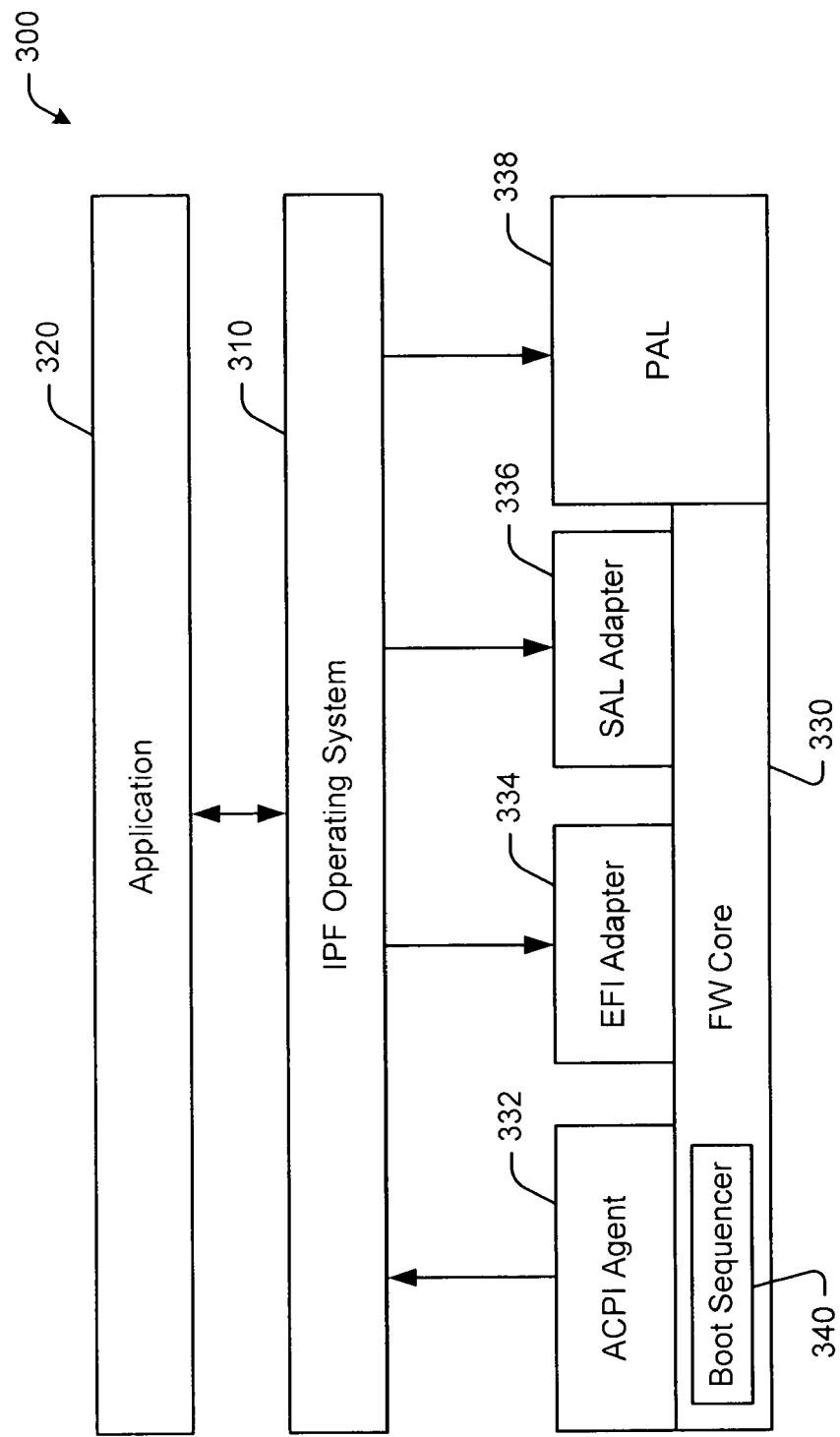
FIG. 3 is a high-level schematic illustration of an exemplary software stack for a computer system implementing speedy boot.

FIG. 3 is a high-level schematic illustration of an exemplary software stack 300 for a computer system implementing speedy boot (e.g., the computer systems 100 and 200 in FIGS. 1 and 2, respectively). For purposes of illustration, software stack 300 is a Framework plus Components model. In general, a framework is a domain-specific set of software functionality that comprises the major body of the system functionality. Components interact collaboratively with the framework and each other via clearly defined interfaces to achieve the overall system function. It is noted, however, that software stack 300 is not limited to any particular architecture.

Software stack 300 represents all of the non-CPU-specific (e.g., PAL) system firmware that executes on the IPF computational processors, as opposed to management processors (MP) and utility microcontrollers. It is responsible for handling reset and power on events, hardware discovery and initialization, hardware description, system software loading and launching, and hardware dependent functions during normal system operation, including hardware reconfiguration and error handling.

Exemplary software stack 300 includes an OS 310 (corresponding to OS 230 in FIG. 2) and application(s) 320. For example, OS 310 may be the IPF HP-UX OS and application 320 may be HP-UX application(s). A firmware core 330 provides standard IPF firmware interfaces (ACPI agent 332, EFI adapter 334, and SAL adapter 336). It is noted that EFI adapter 334, SAL adapter 336, and PAL 338 correspond to EFI 246, SAL 244, and PAL 242 in FIG. 2, respectively.

ACPI agent 332 is responsible for exporting ACPI (standard) firmware functionality. In an exemplary embodiment, ACPI agent 332 is given control after the core 330 is initialized during the boot sequence, to convert internal representations of the system to those required by external standards. It is similar to a proxy design pattern in that it separates evolution of the ACPI interface from those employed internally to describe the system and to control some hardware functions.

EFI adapter 334 is the IA-64 standard set of external interfaces (procedure call based) that provides boot services to the OS loader and early OS initialization code. It also contains a very minimal set of runtime services that are available even after the OS is given full control and when the boot-time services become unavailable. The EFI package may also contain an EFI-boot-driver runtime infrastructure to support standard EFI boot drivers.

SAL adapter 336 implements the standard IA-64 firmware procedure interfaces required by the IA-64 architecture. It also implements the OEM-specific procedures for product differentiation functions. Internally, there may be separation of OEM specific functionality into a sub-package or separate component(s).

SAL adapter 336 enables functional extensions that do not require operating system support or new firmware interfaces. Typically, such functionality would be implemented with a combination of specialized hardware with firmware assist. The SAL adapter is similar to ACPI Agent 332, EFI adapter 334, and SAL adapter 336 in that the program image is instantiated as a separate program entity into main memory by a boot sequencer 340. However, it differs from these others which provide an interface between operating system software and firmware. Instead the SAL adapter 336 provides an interface with PAL 338.

Boot sequencer 340 may be implemented in the firmware core 330. Before resetting the computer system, boot sequencer 340 may execute a decision to perform either a full system reset or a speedy boot procedure. On a full system reset, boot sequencer 340 implements the boot sequence to reset the firmware core 330 and all of the OS interfaces. If the speedy boot procedure is enabled, the boot sequencer 340 implements the boot sequence to bypass resetting the firmware core 330 and only resets the OS interfaces and any cached data. Various POST tests may be bypassed to further speed recovery of the computer system to a usable state.

It is noted that the exemplary implementations discussed above are provided for purposes of illustration. Still other implementations are also contemplated.

Exemplary Operations

Figure 4:
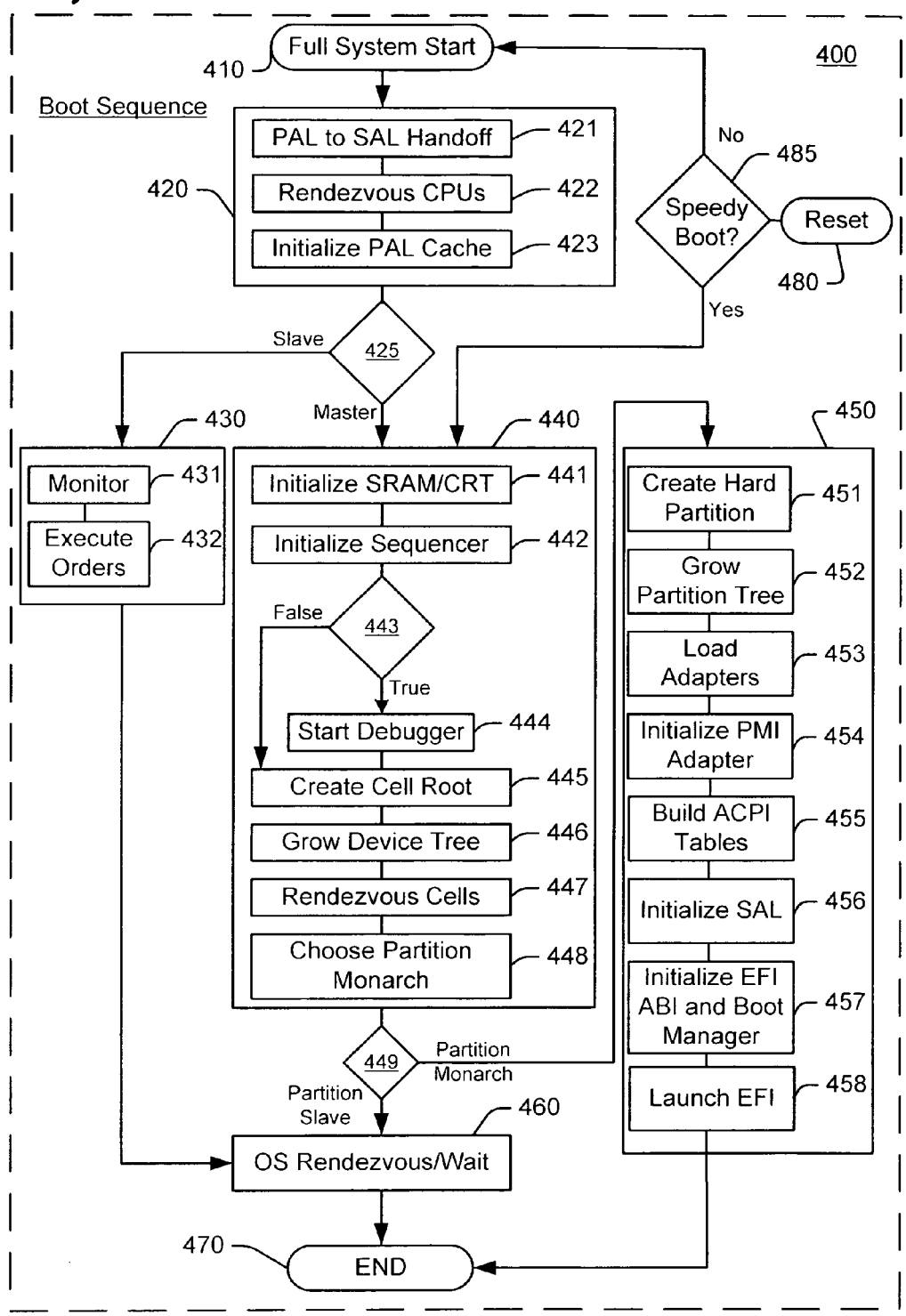
FIG. 4 is a flowchart illustrating an exemplary full system boot sequence with speedy boot option for a computer system.

FIGS. 4 and 5 are flowcharts illustrating exemplary operations to implement speedy boot for a computer system. The operations may be embodied as logic instructions on one or more computer-readable media. When executed on a processor, the logic instructions cause a general purpose computing device to be programmed as a special-purpose machine that implements the described operations. In an exemplary implementation, the components and connections depicted in the figures may be used to implement speedy boot for computer systems.

FIG. 4 illustrates an exemplary full system boot sequence 400 with a speedy boot option for a computer system. Operational Block 410 represents power-on/reset and execution of the Intel Processor Abstraction Layer (PAL) Firmware. Exiting PAL and entering operational block 420 is the first time the System Abstraction Layer (SAL) firmware is executed. Operation 421 represents the architected PAL to SAL handoff. Operation 422 represents the firmware that performs the health-check (status from PAL). Unhealthy processors (those that fail PAL self tests) are prevented from continuing execution.

Healthy processors continue processing during operation 423 where each processor calls the PAL service to initialize its own internal cache memory. Each CPU then executes a decision 425 and either enters the operational block 430 or operational block 440.

If the CPU is a slave it begins monitoring 431 orders from the master to execute in block 432. Examples of orders include coordinated Self Test operations as well as commands to continue on to become an Application Processor (AP) in operation 460. The Slaves also monitor the forward/progress and health of the Master. Upon detecting a master failure (by observing lack of forward progress through the processing steps 441-448), a cell slave will promote itself to master and de-configure the master, log the error event and then reset the server. Upon reboot, a different master is selected and boot proceeds.

Up through decision point 425, the CPUs are executing without a stack using only registers and ROM. After the stacks are created by the master for each CPU in its cell, orders are sent to the monitoring slaves (e.g., those in operation 431) to initialize their internal registers to use the new stacks and interrupt tables. Subsequently slaves can be commanded to execute orders also written in high level language.

The first critical task (operational block 441) for the cell master is to initialize the SRAM and C-runtime (CRT) environment so the rest of the processing steps can be written in the high-level language that requires a stack, and software resources such as a heap and interrupt tables may be used. The cell master then initializes data structures used for orchestrating the sequencing of the rest of the cell boot strap, as shown in operational block 442. Operational block 443 is a decision point that enables an internal debugging module if a Non-Volatile RAM (NVRAM) configuration option had been previously set to true. If this variable is true, operational block 444 is performed. This debugger contains a simple UART and/or LAN device driver for interactive or remote debugging. If the variable is false, the Cell Master skips block 444 and continues with its per-cell initialization in block 445.

Operational block 445 creates the root of a tree-based (hierarchical) database employed by the firmware architecture and initializes the minimal component/framework data structures to allow growing branches and nodes of the database. Operational block 446 represents the discovery and initialization of various hardware elements (e.g., memory, IO). As elements are discovered and initialized the tree database 'grows' new branches and nodes.

Following operational block 446, the cells communicate with each other and determine which cells are actually booting and healthy. The intended set of cells is described in an NVRAM database that is stored within each Cell prior to its release from reset by the power controller subsystem. This cell rendezvous in block 447 is done through cell-to-cell interactions using hardware that does not yet depend upon functioning main memory.

In block 448, the Cell Masters participating in the Rendezvous Cells operation (e.g., those at operation 447) choose one of them to become the Partition Monarch. According to the outcome of this process a decision 449 is executed by each Cell Master. The CPU that is the Partition Monarch continues to initialize the server in operational block 450, and the Cell Master processors that are not promoted become Partition Slaves and enter the wait loop 460 from which they are later launched by the operating system.

In operational block 451, the partition monarch initializes the hardware within each cell to 'connect' the cells into a single, large, Symmetric Multi-Processing (SMP) server. Having done this, it is then possible to re-initialize the memory controllers within each cell to interleave memory across multiple cells. It is also possible to graft the roots of each cell local device tree into a single rooted-tree called the partition tree. Also, partition-level firmware database structures such as the NVRAM manager for EFI variables are initialized and made ready during operation 452.

Main memory is now ready to be used to load PAL and the OS-interface adapters (e.g., those shown in FIG. 3) in operation 453. The PMI (Platform Management Interrupt) adapter is initialized first in operational block 454. Memory is selected for the ACPI tables and they are constructed by calling into the ACPI Agent in operation 455. The SAL adapter is initialized next in operation 456. This program layer calls into the core firmware to obtain the descriptions of memory and I/O resources for the operating system. Various tables are built, including a map of memory for the EFI adapter, and a map of the PCI devices that are present which is used to hold synchronization locks for subsequent calls to SAL.

The EFI adapter is then called in operation 457 from the SAL adapter and EFI is initialized. In operation 458 the EFI shell is entered if the system is not set to auto boot or if it is set to auto boot, the boot manager uses the boot variables to select the boot device and it loads the EFI program which is usually an OS loader.

Operational block 470 represents the launch into the EFI program at which time the OS and other system software begins controlling the machine. This handoff represents the end of responsibility of firmware control of the Boot Startup Processor (BSP) which will usually make procedure calls into EFI, SAL and PAL to collect information about the hardware and continue system initialization.

During operation, the computer system may need to be reset 480. In an exemplary embodiment, a determination is made (e.g., at decision block 485) for a full system start or a speedy boot procedure. On a full system start (or reset), the firmware core (e.g., firmware core 330 in FIG. 3) and all OS interfaces are reset. If the speedy boot procedure is enabled, operations return to the load adapters 440, the firmware core is not reset and only the OS interfaces and any cached data are reset. In addition, various POST tests may be bypassed to further speed recovery of the computer system to a usable state.

FIG. 5 is a flowchart illustrating exemplary operations 500 to implement speedy boot for a computer system. In operation 510 the computer system initiates a reset (e.g., selected by the user or software executing on the computer system). A determination is made in operation 520 whether the speedy boot option is enabled. If the speedy boot option is not enabled, the computer system may execute a full system boot in operation 525 (e.g., as described above with reference to FIG. 4).

Alternatively, if the speedy boot option is enabled in operation 520, the computer system executes a speedy boot procedure illustrated in operations 530-570. In operation 530, PAL initiates platform management interrupt (PMI) to "soft" reset the processor. The PMI is a low-level, out-of-band interrupt that goes directly to the firmware and takes the processor as close to resetting without actually resetting any of the processor's hardware.

In operation 540, the memory is freed to clear memory allocations and I/O hardware is reset. In operation 550, memory is allocated for the firmware adapters (e.g., ACPI agent 332, EFI adapter 334, SAL adapter 336, and PAL 338 in FIG. 3) and a new memory map is generated. In an exemplary embodiment, memory is not reset and only a new memory map is generated to further speed recovery during reset.

In operation 560, the firmware adapters (e.g., ACPI agent 332, EFI adapter 334, SAL adapter 336, and PAL 338 in FIG. 3) are reset. In operation 570, the OS is loaded into memory. As with a full system reset, the OS and corresponding application software controls all of the one or more processors and the firmware is no longer in control of the computer system at this point.

The operations shown and described herein are provided to illustrate exemplary implementations of speedy boot for computer systems and are not intended to be limiting. For example, a different boot sequence may be implemented and the corresponding speedy boot operations may therefore also vary based at least in part on design considerations.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A computer system comprising:
   a firmware core having a plurality of operating system (OS) interfaces;
   a boot sequencer embedded in the firmware core, the boot sequencer implementing a boot sequence executing the following steps for a speedy boot procedure called by the boot sequencer:
   invoking a platform management interrupt (PMI) to soft reset a processor without resetting hardware far the processor;
   bypassing at least same initialization procedures and tests to speed recovery of the computer system to a usable state;
   reallocating memory for the operating system interfaces;
   generating a new memory map for the reallocated memory; and
   resetting the operating system interfaces and loading an operating system.

2. The computer system of claim 1 wherein the computer system is a symmetric multiprocessing system with the OS interfaces including an ACPI agent, and EFI adapter, and a SAL adapter.

3. The computer system of claim 1 wherein the computer system is a symmetric multiprocessing system with OS interfaces including PAL.

4. The computer system of claim 1 wherein the speedy boot procedure returns the system to the usable state without resetting the processor hardware.

5. The computer system of claim 1 wherein the speedy boot procedure bypasses hardware setup and POST tests.

6. The computer system of claim 1 wherein the speedy boot procedure resets cached data.

7. The computer system of claim 1 wherein the speedy boot procedure generates the new memory map without clearing the memory.

8. The computer system of claim 1 wherein the speedy boot procedure resets I/O hardware.

9. The computer system of claim 8 wherein the speedy boot procedure identifies the reset I/O hardware for the firmware core.

10. A method of speedy boot for a computer system, comprising:
    invoking a platform management interrupt (PMI) to soft reset a processor without resetting hardware for the processor;
    bypassing at least some initialization procedures and tests to speed recovery of the computer system to a usable state;
    reallocating memory for operating system interfaces;
    generating a new memory map for the reallocated memory; and
    resetting the operating system interfaces and loading an operating system.

11. The method of claim 10 wherein the PMI resets the operating system interfaces without resetting a firmware core for the processor.

12. The method of claim 10 further comprising bypassing POST tests.

13. The method of claim 10 further comprising resetting cached data.

14. The method of claim 10 further comprising resetting I/O hardware and updating a firmware core for the reset I/O hardware.

15. A computer system comprising:
   at least one processing means having operating system interfaces;
   a speedy boot option executing the following steps:
      invoking a platform management interrupt (PMI) to soft reset a processor without resetting hardware for the processor;
      bypassing at least some initialization procedures and tests to speed recovery of the computer system to a usable state;
      reallocating memory for the operating system interfaces;
      generating a new memory map for the reallocated memory; and
      resetting the operating system interfaces and loading an operating system.

16. The computer system of claim 15 further comprising means for resetting I/O hardware.

* * * * *

UNITED STATES PATENT AND TRADEMARK OFFICE
CERTIFICATE OF CORRECTION

| | | |
|---|---|---|
| PATENT NO. | : 7,568,090 B2 | Page 1 of 1 |
| APPLICATION NO. | : 11/159757 | |
| DATED | : July 28, 2009 | |
| INVENTOR(S) | : John A. Morrison et al. | |

It is certified that error appears in the above-identified patent and that said Letters Patent is hereby corrected as shown below:

In column 8, line 18, in Claim 1, delete "far" and insert -- for --, therefor.

Signed and Sealed this

Third Day of November, 2009

David J. Kappos
*Director of the United States Patent and Trademark Office*